United States Patent [19]
Ikeda

[11] 3,871,923
[45] Mar. 18, 1975

[54] STORAGE BATTERY
[75] Inventor: Seiichiro Ikeda, Takatsuki, Japan
[73] Assignee: Yuasa Battery Company Limited, Takatsuki, Japan
[22] Filed: Nov. 16, 1973
[21] Appl. No.: 416,498

[30] Foreign Application Priority Data
Dec. 14, 1972 Japan............................47-125424

[52] U.S. Cl................................. 136/162, 136/159
[51] Int. Cl. ............................................ H01m 7/02
[58] Field of Search..................... 136/162, 160, 159; 137/386

[56] References Cited
UNITED STATES PATENTS
| | | | |
|---|---|---|---|
| 1,565,347 | 12/1925 | Willard............................ | 136/162 X |
| 2,139,477 | 12/1938 | Townsend........................ | 136/162 X |
| 3,249,132 | 5/1966 | Eberle.............................. | 136/162 X |

Primary Examiner—Winston A. Douglas
Assistant Examiner—John F. Niebling
Attorney, Agent, or Firm—Watson, Cole, Grindle & Watson

[57] ABSTRACT

This invention relates to a storage battery provided with an improved liquid feeding device and gas exhausting device.

This storage battery is formed of a storage battery provided with a monoblock battery container containing such battery elements as plates and separators for each cell and with a novel liquid feeding device and gas exhausting device in a lid. The liquid feeding device has a liquid supplying part communicating with a water tank or an air source and with each cell through an electrolyte level setting tube. The gas exhausting device is formed by containing a valve which closes the passages into each cell at the time of feeding the liquid but can open the above mentioned passage when oxygen and hydrogen gases generated within the storage battery are to be replaced with air fed into each cell from the liquid supplying part.

The storage battery of the present invention, by the above mentioned liquid feeding device and gas exhausting device, enables liquid to be safely fed to a fixed level without an explosion within the battery and also allows the operation to be carried out very simply and positively.

7 Claims, 2 Drawing Figures

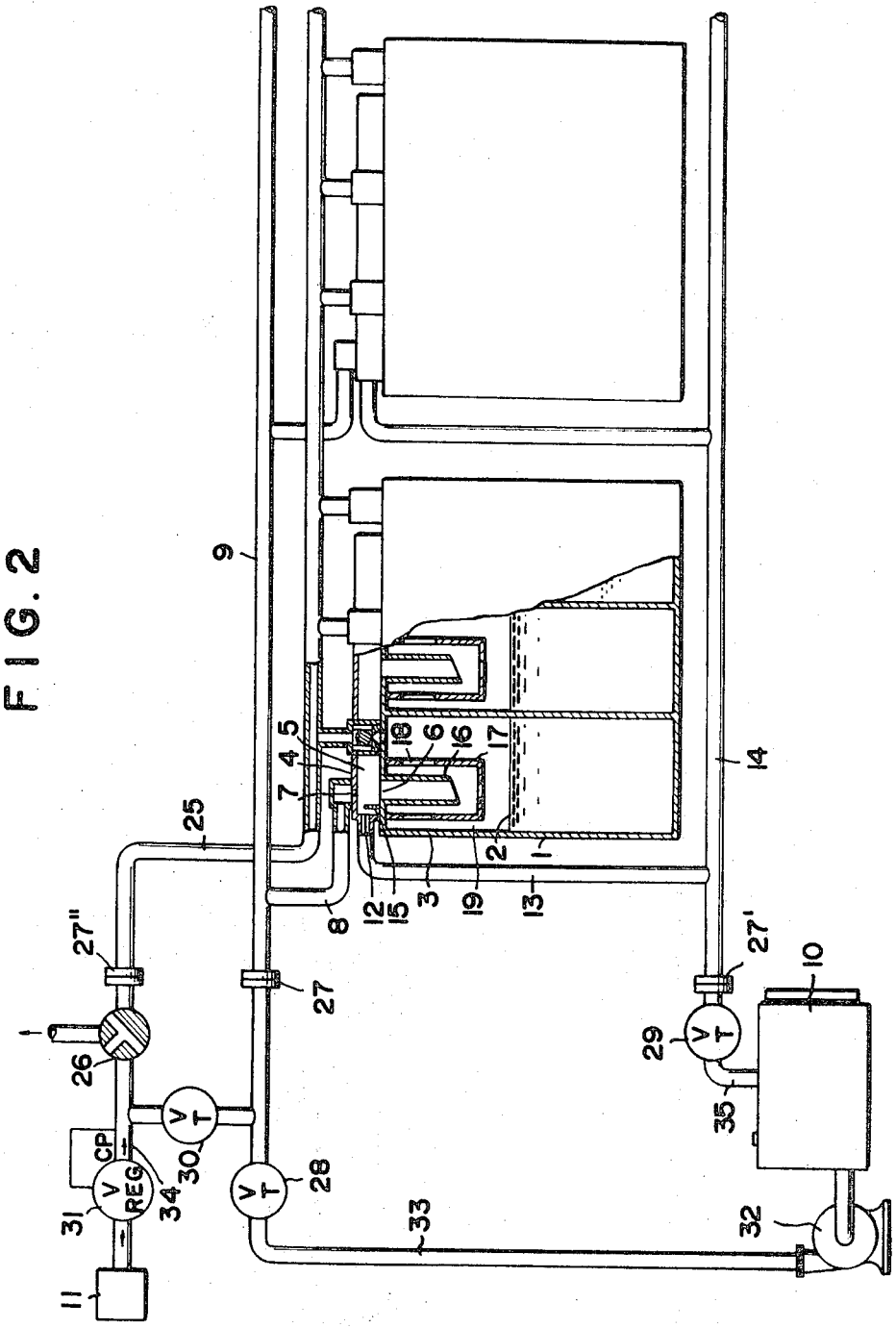

STORAGE BATTERY

BACKGROUND OF THE INVENTION

This invention relates to storage batteries and more particularly to a storage battery provided with a novel liquid feeding device and gas exhausting device.

In a conventional storage battery, oxygen and hydrogen gases will be generated and the water content will decrease during the use of the battery particularly during the charging cycle and, therefore, it is necessary to properly feed water to the cells of the battery. It is also well known that, in a battery group, water is fed collectively to respective cells through a piping from a water tank.

There have been defects in the previous systems in that, at the time of starting or stopping such water supply, when the water supply is either continuous or intermittent, a spark will be generated in the position, the above mentioned oxygen and hydrogen gases will be ignited thereby causing an explosion. As a result of this explosion, the storage battery will be broken.

SUMMARY OF THE INVENTION

The present invention is to eliminate the above mentioned defects.

The first object of the present invention is to provide a storage battery wherein the liquid feeding and gas exhausting operations are carried out safely.

The second object of the present invention is to provide a storage battery provided with an inexpensive liquid feeding device and gas exhausting device.

These objects of the present invention are easily understood by referring to the following description and the accompanying drawings.

BRIEF DESCRIPTION OF THE DRAWINGS

FIG. 2 is a somewhat diagrammatic illustration of a system for collectively feeding liquid to several storage batteries.

DESCRIPTION OF THE PREFERRED EMBODIMENT

Figure 1:
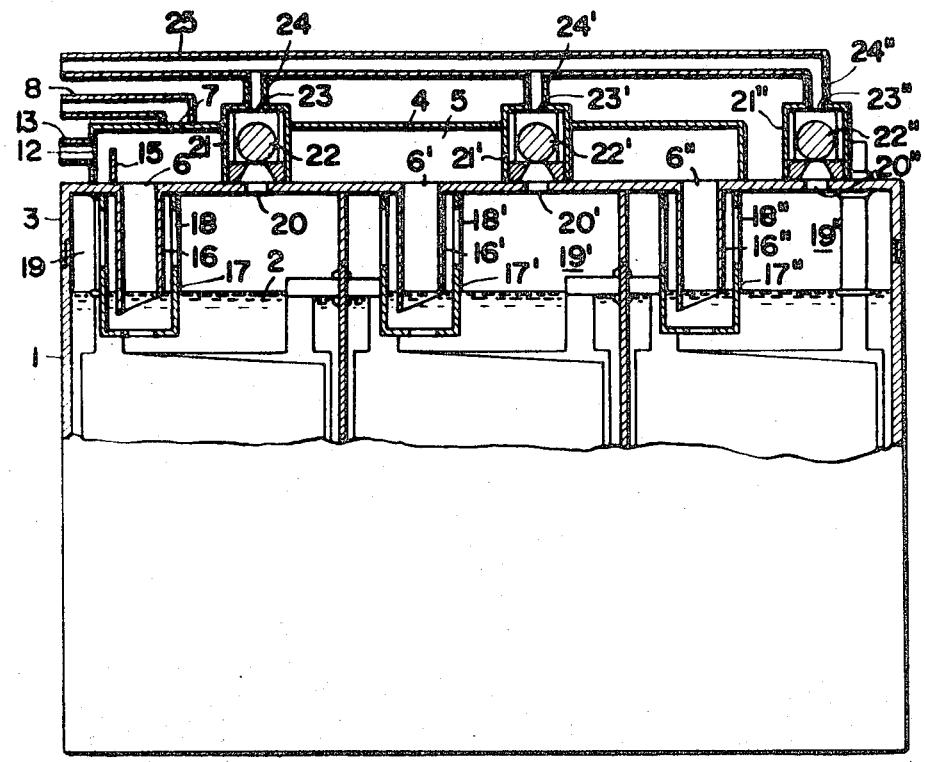
FIG. 1 is a partly vertically sectioned view of an essential part of a storage battery showing an embodiment of the present invention.

In the drawings, a monoblock battery container 1 made of a synthetic resin and is separated into a plurality of cells through partition walls. Such well known battery elements as plates and separators and an electrolyte 2 for carrying out an electrochemical reaction are contained in each cell. A storage battery lid 3 is made of the same material as the battery container 1 and is provided with liquid supplying part 4 on the upper surface. Liquid supplying part 4 is slender and has a chamber 5 formed within it. Chamber 5 communicates with the respective cells of the storage battery through holes 6, 6' and 6'' made in the lid 3 and also with a water tank 10 or an air source 11 through a aperture 7 made in the upper part of the liquid supplying part 4 and through a water supplying branch tube 8 and water supplying main tube 9. Chamber 5 communicates further with the water tank 10 through a hole 12 made at one end of the liquid supplying part 4 and through a water exhausting branch tube 13 and water exhausting main tube 14. A partition wall 15 having a clearance above it is provided in front of the above mentioned hole 12. Electrolyte level setting tubes 16, 16' and 16'', which are provided on the back of lid 3, are suspended downward towards the respective cells from the position of the holes 6, 6' and 6'' as centers. Guard tubes 17, 17' and 17'' are located outside and concentrically with the respective electrolyte level setting tubes 16, 16' and 16'' are also provided on the back of the lid 3.

The electrolyte level setting tubes 16, 16' and 16'' are opened at the lower ends and the guard tubes 17, 17' and 17'' are also partly opened at the lower ends and have holes 18, 18' and 18'' properly made in the side walls so as to communicate with spaces 19, 19' and 19'' within the storage battery. Further, gas exhausting holes 20, 20' and 20'' communicating respectively with the spaces 19, 19' and 19'' of the respective cells are provided in the lid 3 and gas exhausting parts 21, 21' and 21'' are formed respectively above them. Exhaust parts 21, 21' and 21'', which are provided for the respective cells, contain respectively spherical valves 22, 22' and 22'', which are made of plastics and functions as check valves.

Holes 23, 23' and 23'', provided above valves 22, 22' and 22'' communicate with a cross valve 26 respectively through gas exhausting branch tubes 24, 24' and 24'' and a gas exhausting main tube 25. Cross valve 26 communicates with the atmosphere on one side and with the air source 11 on the other side by switching. Elements 27, 27' and 27'' are removable tube couplers. Elements 28, 29 and 30 are stop valves. Element 31 is a gas pressure regulation valve. Element 32 is a pump. Element 33 is a water supplying tube. Element 34 is a vent tube. Element 35 is a water returning tube.

Now, the liquid supplying operation in the storage battery according to the present invention shall be explained. First of all, before water is fed into the storage battery from the water tank 10, air is sent into the storage battery in order to exhaust the oxygen gas and hydrogen gas out of the storage battery into the atmosphere. Thus air under a fixed pressure regulated through the pressure regulation valve 31 provided in the vent tube 34 is sent from the air source 11 into the respective space parts 19, 19' and 19'' within the storage battery cells through the opened stop valve 30, water supplying main tube 9, water supplying branch tube 8, liquid supplying part 5, electrolyte level setting tubes 16, 16' and 16'' and holes 18, 18' and 18'' of the guard tubes 17, 17' and 17''. The explosive oxygen gas and hydrogen gas generated and staying within the storage battery will push up the valves 22, 22' and 22'' respectively of the gas exhausting parts 21, 21' and 21'' due to the supply of the air under the fixed pressure, and will be exhausted into the atmosphere through the gas exhausting branch tubes 24, 24' and 24'', gas exhausting main tube 25 and cross valve 26.

During this stage of the operation, the stop valves 28 and 29 and the passage to the air source of the cross valve 26 will remain closed. Thus, the explosive oxygen gas and hydrogen gas will be replaced with nonexplosive air in the space parts 19, 19' and 19'' within the storage battery cells and the above described explosion will be prevented and the risk of a break in the storage battery is eliminated. Then, the supply of water into each cell is started.

Thus, water is fed into the respective cells with the pump 32 from the water tank 10 through the opened stop valve 28 provided in the water supplying tube 33, water supplying main tube 9, water supplying branch tube 8, liquid supplying part 4, holes 6, 6' and 6'' and electrolyte level setting tubes 16, 16' and 16''. On the other hand, air under the fixed pressure from the air source will be introduced into the gas exhausting parts 21, 21' and 21'' through the cross valve 26, gas exhausting main tube 25 and gas exhausting branch tubes 24, 24' and 24'' so as to press the valves 22, 22' and 22'' from above. Valves 22, 22' and 22'' thus will perform the role of a check valve. As a result, the air present in the space parts 19, 19' and 19'' within the storage battery cells will remain unexhausted. During this stage of the operation, the stop valve 30 and the outward passage of the cross valve 26 will remain closed. When the already described water supply is thus started, the electrolyte level in each cell will rise, for example, from the position shown in FIG. 2 to the position shown in FIG. 1 and will stop at the lower ends of the electrolyte level setting tubes 16, 16' and 16''.

The subsequent water supply is stopped by closing the stop valve 28 and the excess water present in the chamber 5 of the liquid supplying part 4 will be returned to the water tank 10 through the hole 12, water exhausting branch tube 13, water exhausting main tube 14 and opened stop valve 29 provided in the water returning tube 35. In such case, the guard tubes 17, 17' and 17'' will guard the lower ends of the respective electrolyte level setting tubes 16, 16' and 16'' against the influence in case the electrolyte level rocks and will, as a result, serve to elevate the precision of setting the electrolyte level. The partition wall 15 will also serve to temporarily pool water in the chamber 5 of the liquid supplying part 4.

At the same time, they are effective to prevent the electrolyte containing sulfuric acid within the storage battery from escaping out while being diffused. The tube couplers 27, 27' and 27'' are used to removably connect respectively the water supplying main tube 9 with the water supplying tube 33, the water exhausting main tube 14 with the water returning tube 35 and the gas exhausting main tube 25 with the vent tube 34.

After the water supply to the storage battery is completed, air is sent into the storage battery from the air source 11 in the same manner as in the operation carried out before starting the water supply so that the water remaining in the passage of the water supply and containing some sulfuric acid may be cleaned and the already described generation of a spark may be very effectively prevented. As a result, the explosion can be perfectly prevented. After the above mentioned operations have been completed, the storage battery is released by disconnecting each tube coupler.

The present invention is, as described above, a storage battery provided with a liquid feeding device whereby the explosive oxygen gas and hydrogen gas generated within the storage battery during the use are exhausted and are replaced with air. In accordance with the present invention, water is fed collectively into many storage battery cells and, therefore, has the advantage that a fixed amount of an liquid can be simultaneously and positively fed into all the cells by a safe liquid feeding operation thereby preventing an explosion.

Needless to say, various modifications are also possible in a range not deviating from the spirit of the present invention. For example, though the storage battery already described as an embodiment of the present invention is a 6-volt storage battery of three cells, the present invention can be applied also to a battery group of two or more storage batteries having any number of cells.

What is claimed is:

1. A storage battery adapted to be supplied with air from an air source and water from a water supply tank, the battery comprising:

a monoblock battery container having a plurality of storage cells arranged therein and a lid covering said cells, said lid being provided with liquid supplying means for use in supplying air and water to said cells and gas exhausting means for use in exhausting oxygen and hydrogen produced in said cells from said cells;

said liquid supplying means including a slender section provided within said lid;

a plurality of electrolyte level setting tubes arranged in communication with said slender section each extending in a downward direction from the back of said lid into a respective one of said cells;

a plurality of gas passageways, each arranged in communication with a respective one of said cells;

said gas exhausting means including a plurality of valves, each arranged within a respective gas passageway;

means adapted for supplying air from the air source into each of said cells through said liquid supplying means and said electrolyte level setting tubes and causing an exhaust flow of oxygen and hydrogen gas from within said cells to escape through said gas exhausting means into the atmosphere;

means adapted for discontinuing the flow of air into said cell and the exhaust of the exhaust gases and subsequently to feed water from the water supply tank into each of said cells through said liquid supplying means and said electrolyte level setting tubes; and, means adapted for supplying air from the air source into said gas exhausting means so as to cause the closure of said valves when water is being supplied to said cells.

2. A storage battery as defined in claim 1 further comprising: a water supply branch tube adapted for being coupled with the water supply tank and the air source through a water supply main tube, said water supply branch tube serving to interconnect the water supply main tube with said liquid supply means; and, a water exhaust branch tube adapted for being arranged in communication with the water supply tank through a water exhausting main tube, said water exhaust branch tube serving to interconnect said liquid supply means and the water exhausting main tube.

3. A storage battery as defined in claim 1 wherein: said gas exhausting means includes a plurality of chambers provided within the lid, each chamber being associated with a respective one of said cells; each of said valves is a spherical valve and is arranged within a respective one of said chambers; and, further comprising a gas exhausting branch tube arranged in communication with each of said chambers and adapted to be arranged in communication with a gas exhausting main tube.

4. A storage battery as defined in claim 1 further comprising a plurality of guard tubes, each arranged around and concentric with a respective one of said electrolyte level setting tubes, said guard tubes being provided on the back of said lid and being partially opened at its lower end and provided with a plurality of holes in its side walls.

5. A storage battery as defined in claim 3 further comprising a partition wall provided at the end of said slender section of said liquid supplying means which is arranged in communication with said water exhausting branch tube.

6. A storage battery as defined in claim 1 further comprising means adapted for supplying air from the air source to said cells after the supply of water has been completed, the air being supplied through said liquid supplying means so that any water remaining in the passage of the water supply and possibly containing sulfuric acid is cleansed.

7. A storage battery adapted to be supplied with air from an air source and water from a water supply tank, the battery comprising:

a monoblock battery container having a plurality of storage cells arranged therein;

liquid supplying means for use in supplying air and water to said cells;

gas exhausting means for use in exhausting oxygen and hydrogen produced in said cells from said cells;

means adapted for supplying air from the air source to said cells through said liquid supplying means, for causing the exhaust of oxygen and hydrogen from said cells through said gas exhausting means;

means adapted for discontinuing the flow of air into said cells and the exhaust of the exhaust gases and subsequently to feed water from the water supply tank into each of said cells through said liquid supplying means; and, means adapted for supplying air from the air source into said gas exhausting means so as to cause the blocking of the exhaust of gases through said gas exhausting means when water is being supplied to said cells.

* * * * *